United States Patent
Sawamura (10) Patent No.: US 9,822,917 B2
(45) Date of Patent: Nov. 21, 2017

(54) TUBE END CONNECTOR AND ZEOLITE SEPARATION MEMBRANE ELEMENT

(71) Applicant: MITSUBISHI CHEMICAL CORPORATION, Minato-ku, Tokyo (JP)

(72) Inventor: Kentaro Sawamura, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 1117 days.

(21) Appl. No.: 13/931,032

(22) Filed: Jun. 28, 2013

(65) Prior Publication Data
US 2013/0285368 A1 Oct. 31, 2013

Related U.S. Application Data (63) Continuation of application No. 11/997,870, filed as application No. PCT/JP2006/311303 on Jun. 6, 2006, now abandoned.

(30) Foreign Application Priority Data
Aug. 12, 2005 (JP) ................................. 2005-234209

(51) Int. Cl.
*B23P 11/02* (2006.01)
*F16L 55/24* (2006.01)
(Continued)

(52) U.S. Cl.
CPC ............ *F16L 55/24* (2013.01); *B01D 65/003* (2013.01); *B01D 71/028* (2013.01); *B23P 11/02* (2013.01); *B23P 11/025* (2013.01); *F16L 13/007* (2013.01); *F16L 13/103* (2013.01); *F16L 47/22* (2013.01); *F16L 47/24* (2013.01);
(Continued)

(58) Field of Classification Search
CPC ......... B23P 11/02; B23P 11/025; F16B 4/006; F16B 4/008; Y10T 29/49865; Y10T 29/49913; Y10T 29/49909; Y10T 29/49927; Y10T 29/49929; Y10T 403/48
See application file for complete search history.

(56) References Cited

U.S. PATENT DOCUMENTS 5,362,522 A    11/1994  Barri et al.
5,687,995 A * 11/1997  Mori ..................... F16L 13/004
                                                  156/86

FOREIGN PATENT DOCUMENTS

JP      59-20082     2/1984
JP      62-72980     4/1987
(Continued)

*Primary Examiner* — Jermie Cozart
(74) *Attorney, Agent, or Firm* — Sughrue Mion, PLLC (57) ABSTRACT

Tube end connector which connects a first tubular member and a second tubular member while securing sealing performance is provided. The tube end connector according to the present invention is provided with a heat-shrinkable Teflon® tube 4b which covers both outer surface of an end portion of a zeolite membrane covered ceramic tube 1 and outer surface of an end portion of a metal tube 5 in conditions of jointing the end portion of the zeolite membrane covered ceramic tube 1 and the end portion of the metal tube 5; and a heat-shrinkable fluororubber tube 3b which is placed at the region between the heat-shrinkable tube 4b and the outer surfaces both of the first tubular member and the second tubular member, and which has solvent resistance and swelling property.

9 Claims, 6 Drawing Sheets (51) Int. Cl.
*B01D 65/00* (2006.01)
*B01D 71/02* (2006.01)
*F16L 13/007* (2006.01)
*F16L 13/10* (2006.01)
*F16L 47/22* (2006.01)
*F16L 47/24* (2006.01)

(52) U.S. Cl.
CPC ...... *B01D 2313/02* (2013.01); *B01D 2313/04* (2013.01); *Y10T 29/49865* (2015.01)

(56) References Cited

FOREIGN PATENT DOCUMENTS

| | | |
|---|---|---|
| JP | 1-159365 | 11/1989 |
| JP | 8-131782 | 5/1996 |
| JP | 11-094146 | 4/1999 |
| JP | 11-264489 | 9/1999 |
| JP | 2001-200963 | 7/2001 |
| JP | 2002-187706 | 7/2002 |
| JP | 2005-188541 | 7/2005 |

\* cited by examiner

TUBE END CONNECTOR AND ZEOLITE SEPARATION MEMBRANE ELEMENT

CROSS REFERENCE TO RELATED APPLICATIONS

This application is a continuation of U.S. patent application Ser. No. 11/997,870, filed May 5, 2008, which is a national stage of International Application No. PCT/JP2006/311303, filed Jun. 6, 2006, claiming priority based on Japanese Patent Application No. 2005-234209, filed Aug. 12, 2005, the contents of all of which are incorporated herein by reference in their entirety.

TECHNICAL FIELD

This invention relates to a tube end connector and a zeolite separation membrane element, and particularly, this invention relates to a tube end connector which connects a first tubular member and a second tubular member while securing sealing performance, and a zeolite separation membrane element.

BACKGROUND ART

Zeolites are crystalline alumino silicates which embrace pores of the order of molecular sizes, and membranes made up of zeolites are widely used as molecular sieves because of their property of selectively allowing molecules to pass through themselves depending on the molecular size or shape. It is known that good energy efficiency can be attained when the zeolite membrane is used for separation between water and organic solvent in a mixed liquid thereof.

Since zeolite membrane does not have sufficient mechanical strength in itself, the zeolite membrane is generally formed on a surface of a porous ceramic tube. When assembling such a zeolite membrane-covered ceramic tube into a module, it is often that a metal tube is jointed to an end of the ceramic tube. Assembling the ceramic tube into the module becomes easy by virtue of such a construction.

The conventional way of jointing the zeolite membrane-covered ceramic tube and the metal tube will be explained.

First, a zeolite membrane-covered ceramic tube, and a metal tube having an outer diameter which is about the same with that of the ceramic tube are provided. A thermally shrinkable tube of which inner diameter is slightly larger than the outer diameter of the metal tube is also provided.

Next, to one end of the thermally shrinkable tube, an end of the zeolite membrane-covered ceramic tube is inserted, and to another end of the thermally shrinkable tube, an end of the metal tube is inserted. Then, by heating the thermally shrinkable tube, the thermally shrinkable tube is allowed to shrink in the direction of decreasing the inner diameter thereof in order to joint the zeolite membrane-covered ceramic tube and the metal tube (See, Patent literature 1). Patent literature 1: JP 8-131782 A (The 8th paragraph)

DISCLOSURE OF INVENTION

Problem to be Solved by the Invention

Incidentally, the above mentioned thermal shrinkable tube has disadvantages that it is hard and lacks elasticity. Generally, both the surface of the metal tube and the surface of the zeolite membrane covered ceramic tube do not show mirror surfaces. Namely, they have less smoothness, and they are in uneven surface conditions at microscopic observations. Further, since the outer shape of the zeolite membrane-covered ceramic tube shows out of round and there is variation among the respective products of zeolite membrane-covered ceramic tube, a perfect correspondence between the outer diameter of the ceramic tube and that of the metal tube can be hardly expected. Therefore, by means of the thermal shrinkable tube of less elasticity, it is impossible to secure an ample sealing performance at the jointing position between the zeolite membrane-covered ceramic tube and metal tube.

The present invention is contributed in consideration of such a situation mentioned above, and a purpose thereof is to provide a tube end connector which joints a first tubular member and a second tubular member while securing sealing performance, as well as a zeolite separation membrane element.

Means for Solving the Problems

In order to solve the above mentioned problems, the tube end connector according to the present invention is characterized in that it contains a covering member which covers both outer surface of an end portion of a first tubular member and outer surface of an end portion of a second tubular member in conditions of jointing the end portion of the first tubular member and the endportion of the second tubular member, and a member which is placed at the region between the covering member and the outer surfaces both of the first tubular member and the second tubular member, and which has solvent resistance and swelling property to solvent.

According to the above mentioned tube end connector, since the member which has solvent resistance and swelling property to solvent is placed at the region between the covering member and both of the first tubular member and the second tubular member, it is possible to connect the first tubular member and the second tubular member, while ensuring the sealing performance, which is due to the self-sealing function provided by the solvent swelling property of the above mentioned member, at the jointing portion of the first tubular member and the second tubular member, even when the first tubular member and the second tubular member have respective surfaces in uneven condition at microscopic observations, or when the outer shapes of these tubular members shows out of round, or when the outer diameters of the first tubular member and the second tubular member do not correspond.

Further, in the tube end connector according to the present invention, it is possible that the first tubular member is a zeolite separation membrane in which zeolite crystals are formed on a porous member, and the second tubular member is a metallic tube.

In addition, in the tube end connector according to the present invention, it is also possible that the second tubular member is replaced with an approximately circular cylindrical member.

Further, in the tube end connector according to the present invention, it is preferable that the volume increment ratio due to swelling is to be not less than 2% and not more than 15%. When the volume increment is less than 2%, it is impossible to obtain an ample sealing function and a self-recovery function. When the volume increment exceeds 15%, the durability (that is, the estimated usable period) becomes lower because of swelling to much.

Still further, in the tube end connector according to the present invention, it is preferable that the above mentioned member shows thermal resistivity in the temperature range of 50-200° C.

In the tube end connector according to the present invention, it is possible that the above mentioned member comprises a first member and second members which are arranged at each side of the first member. The second members are located at sides apart from the jointing portion of the first tubular member and the second tubular member.

Further, in the end connector according to the present invention, the above mentioned member may comprise a heat-shrinkable fluororubber tube or a heat-shrinkable flexible fluorine resin tube.

Still further, in the end connector according to the present invention, the first member may comprise a heat-shrinkable fluororubber tube, and the second member may comprise a heat-shrinkable flexible fluorine resin tube.

Herein, the term "heat-shrinkable fluororubber tube" denotes the heat-shrinkable tube of high thermal resistance fluoroelastomer which is prepared by using fluorine type rubber material as a main raw material and cross-linking the raw material by irradiation and which enjoys an elongation of not less than 250% and a tensile strength of not less than 10 MPa.

The term "heat-shrinkable flexible fluorine resin tube" denotes the heat-shrinkable tube which is prepared by subjecting flame-retarded flexible fluorine resin to electron beam cross linking and which enjoys flexibility capable of using continuously at 200° C.

Further, in the tube end connectors according to the present invention, it is preferable that the above mentioned covering member bears a force capable of contracting toward the inside of the covering member.

In the tube end connectors according to the present invention, it is possible that the above mentioned covering member is composed of a heat-shrinkable tube.

The zeolite separation membrane element according to the present invention is characterized in that it contains
a zeolite separation membrane in which zeolite crystals are formed on a tubular porous support,
metal tubes which are placed so as to be jointed to each end of the zeolite separation membrane,
a covering member which covers both outer surface of each end portion of the zeolite separation membrane and outer surface of an end portion of each metal tube, in conditions of jointing each end portion of the zeolite separation membrane and the end portion of each metal tube, respectively, and
a member which is placed at the region between the covering member and the outer surfaces both of the zeolite separation membrane and the metal tubes, and which has solvent resistance and swelling property to solvent.

Effect of the Invention

As described above, in accordance with the present invention, it is possible to provide a tube end connector which connects a first tubular member and a second tubular member or a zeolite separation membrane element, while securing sealing performance.

BRIEF DESCRIPTION OF THE DRAWINGS

FIG. 2 (A)-(C) are sectional views of showing the self-sealing function of the tube end connector.

FIG. 3 (A)-(C) are sectional views showing the variation in the surface roughness of the outer surface of zeolite membrane covered ceramic tubes.

FIGS. 4 (A) and (B) are sectional views showing the self-recovery function owing to the swelling of the heat-shrinkable fluororubber tube.

EXPLANATION OF NUMERALS

1 - - - Zeolite membrane covered ceramic tube
2 - - - Circular cylindrical member
3a, 3b - - - Heat-shrinkable fluororubber tube
4a, 4b - - - Heat-shrinkable tube made of Teflon®
5 - - - Metal tube
7 - - - Container
7 - - - Outlet
8 - - - Separator
9 - - - Liquid nitrogen trap (Cold trap)
10 - - - Vacuum pump
12a, 12b, 12c, 12d - - - Heat-shrinkable flexible fluorine resin tube Embodiments for Carrying out the Invention Hereinafter, some embodiments of the present invention will be described with referring to the drawings.
(Embodiment 1)

Figure 1:
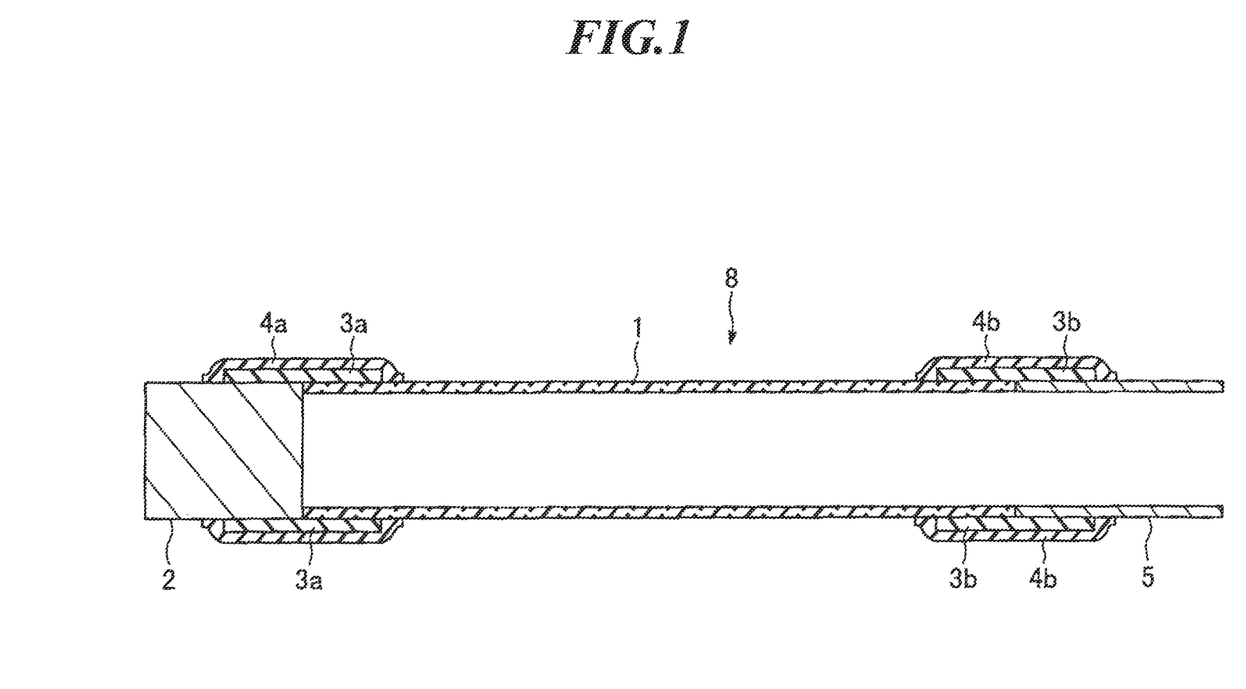
FIG. 1 is a sectional view of showing a state that a zeolite membrane covered ceramic tube is connected with a metal tube and with an approximately circular cylindrical member by means of individual tube end connectors according to Embodiment 1 of the present invention.

FIG. 1 is a sectional view of showing a state that a zeolite membrane covered ceramic tube is connected with a metal tube and with an approximately circular cylindrical member by means of individual tube end connectors according to Embodiment 1 of the present invention.

An A-type zeolite membrane is formed on the surface of a ceramic supporting tube which is made of alumina and has 12 mm in outside diameter, 8.5 mm in inside diameter, and 500 mm in length. Thereby, the zeolite membrane covered ceramic tube 1 where the zeolite membrane is applied on the ceramic tube is prepared. The zeolite membrane covered ceramic tube 1 is a filter element where the zeolite membrane is formed on the surface of the porous supporting tube. In other words, the zeolite membrane covered ceramic tube 1 is a zeolite separation membrane where the zeolite crystals are formed on the porous body. Separately, an approximately circular cylindrical member 2 which is made of SUS304 and has 12 mm in outside diameter, and 20 mm in length, and a heat-shrinkable fluororubber tube (for instance, heat-shrinkable fluororubber tube FE3, manufactured by SUMITOMO ELECTRIC INDUSTORIES, Ltd.) 3a are ready.

Next, to one end of the heat-shrinkable fluororubber tube 3a, one end of the zeolite membrane-covered ceramic tube 1 is inserted, and to the another end of the heat-shrinkable fluororubber tube 3a, one end of the approximately circular cylindrical member 2 is inserted, so that one end of the zeolite membrane-covered ceramic tube 1 is connected to the approximately circular cylindrical member 2 forming a mutual agreement of their axes, and the both sides of this connecting part, each being at about 10 mm in width from the connected part are covered with the heat-shrinkable fluororubber tube 3a. Then, the heat-shrinkable fluororubber tube 3a is allowed to shrink by heating the heat-shrinkable fluororubber tube 3a with a heat gun.

Next, to a heat-shrinkable tube 4a made of Teflon®, the zeolite membrane-covered ceramic tube 1 and the approximately circular cylindrical member 2 are inserted, thereby the heat-shrinkable tube 4a is positioned so that the heat-shrinkable fluororubber tube 3a is covered with the heat-shrinkable tube 4a, and the both sides of the above mentioned connecting part, each being at about 13 mm in width from the connected part are covered with the heat-shrinkable tube 4a. Then, the heat-shrinkable tube 4a made of Teflon® is allowed to shrink by heating the heat-shrinkable tube 4a with a heat gun. Thereby, a force which can tighten the heat-shrinkable fluororubber tube 3a, the approximately circular cylindrical member 2 and the zeolite membrane-covered ceramic tube 1 inwardly is produced by the shrinkage of the heat-shrinkable tube 4a. Thus, the approximately circular cylindrical member 2 and the zeolite membrane-covered ceramic tube 1 can be fixed by the heat-shrinkable tube 4a via the heat-shrinkable fluororubber tube 3a, and at the same time, the one end of the zeolite membrane-covered ceramic tube 1 can be sealed by the approximately circular cylindrical member 2.

Next, to another end of the zeolite membrane-covered ceramic tube 1, an end of a metal tube 5 which is made of SUS304 and has 12 mm in outside diameter, and 9 mm in inside diameter is jointed in a similar fashion as above.

In detail, to one end of the heat-shrinkable fluororubber tube 3b, another end of the zeolite membrane-covered ceramic tube 1 is inserted, and to the other end of the heat-shrinkable fluororubber tube 3b, one end of the metal tube 5 is inserted, so that the other end of the zeolite membrane-covered ceramic tube 1 is jointed to the metal tube 5 forming mutual agreement of their axes, and the both sides of this jointing part, each being at about 10 mm in width from the jointed part are covered with the heat-shrinkable fluororubber tube 3b. Then, the heat-shrinkable fluororubber tube 3b is allowed to shrink by heating the heat-shrinkable fluororubber tube 3b with a heat gun.

Next, to a heat-shrinkable tube 4b made of Teflon®, the zeolite membrane-covered ceramic tube 1 and the metal tube 5 are inserted, thereby the heat-shrinkable tube 4b is positioned so that the heat-shrinkable fluororubber tube 3b is covered with the heat-shrinkable tube 4b, and the both sides of the above mentioned jointing part, each being at about 13 mm in width from the jointed part are covered with the heat-shrinkable tube 4b. Then, the heat-shrinkable tube 4b made of Teflon® is allowed to shrink by heating the heat-shrinkable tube 4b with a heat gun. Thereby, a force which can tighten the heat-shrinkable fluororubber tube 3b, the metal tube 5 and the zeolite membrane-covered ceramic tube 1 inwardly is produced by the shrinkage of the heat-shrinkable tube 4a. Thus, the metal tube 5 and the zeolite membrane-covered ceramic tube 1 can be fixed by the heat-shrinkable tube 4b via the heat-shrinkable fluororubber tube 3b, and at the same time, the jointing part mentioned above can be sealed.

In this way, the one end of the zeolite membrane-covered ceramic tube 1 is connected to the approximately circular cylindrical member 2 by means of the tube end connector, and thereby, the one end of the zeolite membrane-covered ceramic tube is sealed. In addition, the other end of the zeolite membrane-covered ceramic tube is jointed to the metal tube 5 by means of the tube end connector while obtaining a good sealing performance.

The article in which one end of the zeolite membrane-covered ceramic tube 1 is sealed and another end of the zeolite membrane-covered ceramic tube is jointed to the metal tube 5 can be used as a separation element for water—solvent (e.g., ethanol), that is, a separator 8.

Now, with reference to FIG. 2, why the above mentioned tube end connectors which include the heat-shrinkable Teflon® tube 4a, 4b and the heat-shrinkable fluororubber tube 3a, 3b provide excellent sealing properties will be explained. FIG. 2(A)-(C) are sectional views showing the self-sealing function of the tube end connector. Incidentally, in FIG. 2, only the zeolite membrane-covered ceramic tube 1 and the heat-shrinkable fluororubber tube 3a are illustrated.

FIG. 2(A) demonstrates the status just after water-solvent (e.g., ethanol) mixed liquid is supplied into the zeolite membrane-covered ceramic tube 1 the end of which has been connected with the tube end connector in accordance with the above mentioned procedure. Because the outer surface of the zeolite membrane-covered ceramic tube 1 does not show a mirror surface and it is in uneven condition, small gaps are formed between the heat-shrinkable fluororubber tube 3a and the zeolite membrane-covered ceramic tube 1, and therefore, at the initial stage of the supply of the liquid, the liquid leaks out through the minute gaps. When the leaked liquid comes into contact with the heat-shrinkable fluororubber tube 3a, the swelling of the heat-shrinkable fluororubber tube 3a is initiated.

FIG. 2(B) demonstrates the status that the swelling volume of the heat-shrinkable fluororubber tube 3a is enlarged with the passage of time for supplying the liquid, as compared with the status shown in FIG. 2(A). As the swelling volume is enlarged, the gaps formed between the heat-shrinkable fluororubber tube 3a become smaller.

Figure 2:
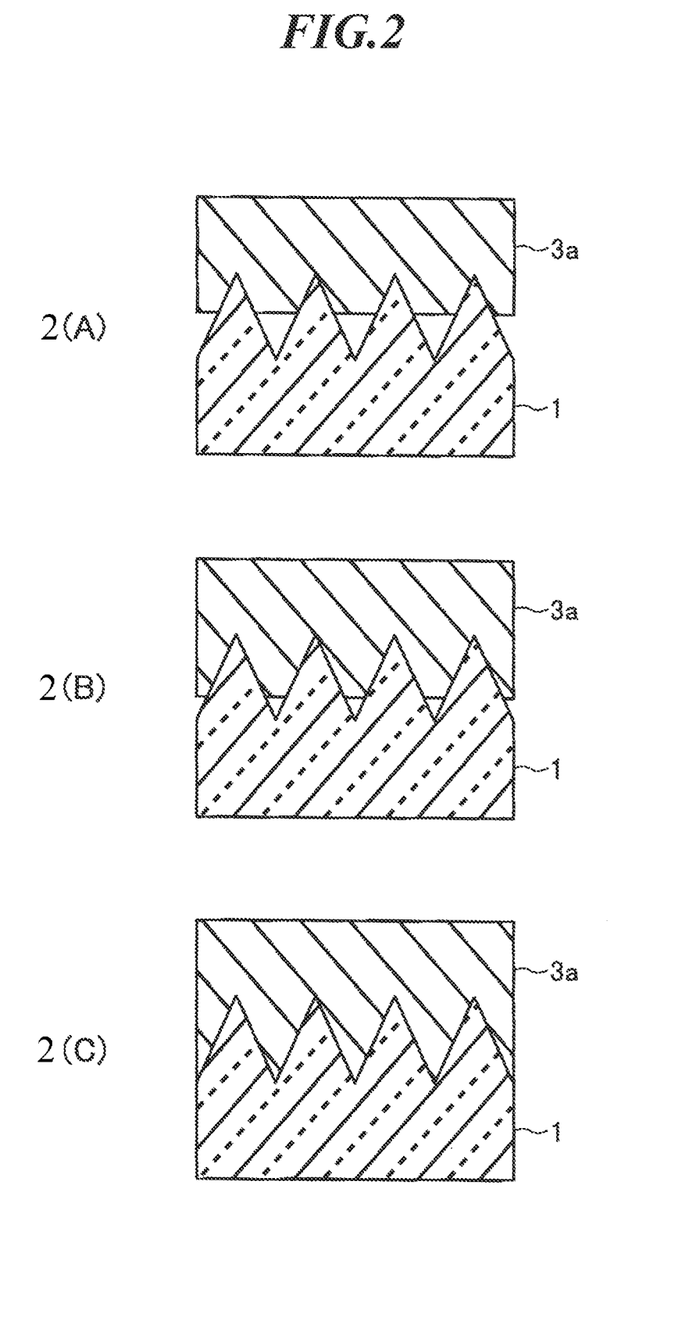

FIG. 2(C) demonstrates the status that the swelling volume of the heat-shrinkable fluororubber tube 3a is further developed as compared with the state shown in FIG. 2(B), and the gaps between the heat-shrinkable fluororubber tube 3a and the zeolite membrane-covered ceramic tube 1 disappear. When reaching this status, the sealing by the tube end connector is completed As shown in FIG. 2 (a-b), by contacting with the solvent, the heat-shrinkable fluororubber tube 3a is brought to swell, and thereby, it exhibits the sealing performance, namely, it owns the self-sealing property. In other words, in order to seal effectively the connecting part, it is necessary to seal positively the leaking portions. When there are some gaps at the connecting part, the solvent and water leak out through the gap. Since the heat-shrinkable fluororubber tube 3a owns the solvent resistance and the swelling property to solvent, the gaps at the connecting parts can be sealed by causing the volume expansion of the heat-shrinkable fluororubber tube 3a as the result of making contact with the solvent (self-sealing property).

Figure 3:
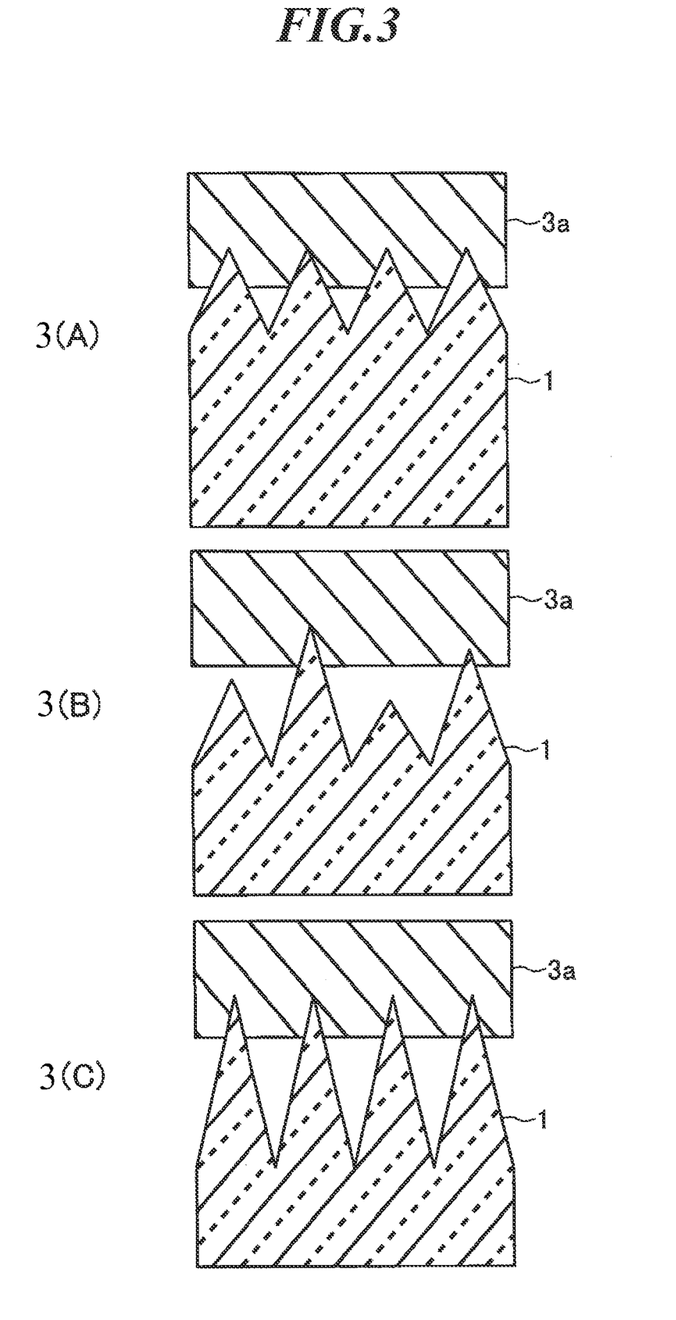

FIG. 3 (A)-(C) are sectional views showing the variation in the surface roughness of the outer surface of zeolite membrane covered ceramic tubes 1. With respect to the surface roughness of the outer surface of zeolite membrane covered ceramic tubes 1, the variation thereof will be in the range of about 0.3-1 μm. Although it is usually difficult to seal certainly the zeolite membrane covered ceramic tubes having such a variation with known tube end connectors, an excellent sealing performance can be realized by utilizing the above mentioned self-sealing property provided by the swelling of the heat-shrinkable fluororubber tube.

Figure 4:
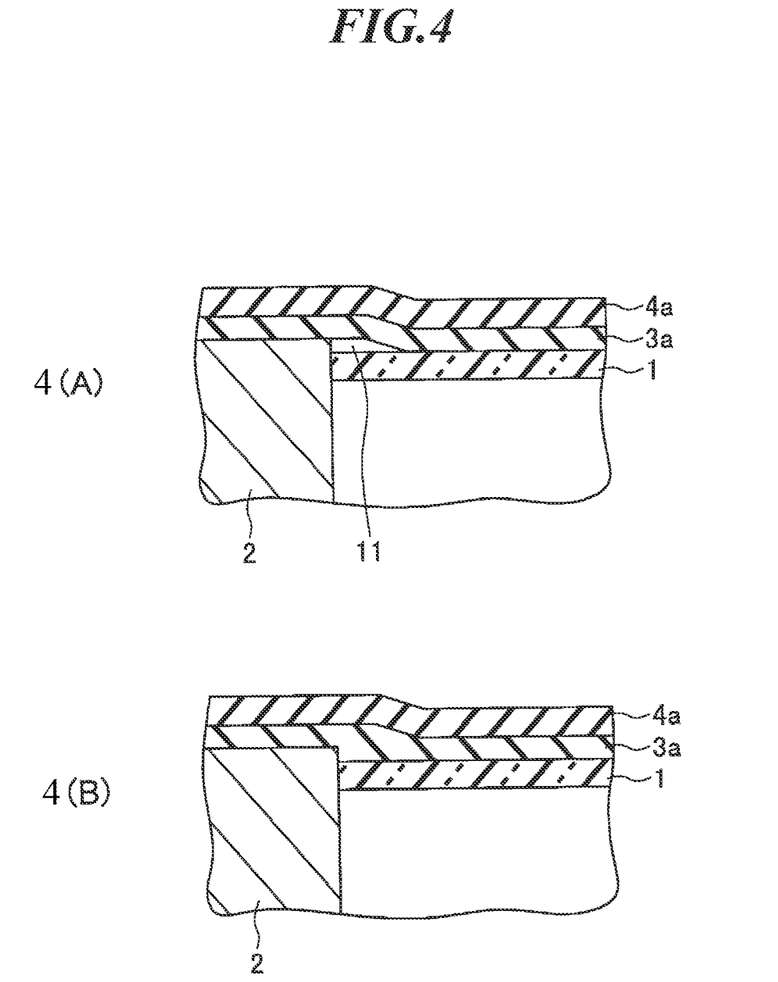

FIGS. 4 (A) and (B) are sectional views showing the self-recovery function owing to the swell of the heat-shrinkable fluororubber tube. In FIG. 4, apart of the connected portion between the zeolite membrane covered ceramic tube 1 and the approximately circular cylindrical member 2 is illustrated.

FIG. 4(A) demonstrates the status of appearing gaps 11 in the connected portion, in the case that the water—solvent separation element as mentioned above is used at a high temperature, for instance, about 50-200° C., wherein the gaps are caused by the differences of thermal expansion since the approximately circular cylindrical member 2, the zeolite membrane covered ceramic tube 1, the heat-shrinkable fluororubber tube 3a and the heat-shrinkable Teflon® tube 4a have mutually different thermal expansion coefficients.

When the gaps 11 are created as shown in FIG. 4(A), the solvent leaks out through the gaps 11. The swelling of heat-shrinkable fluororubber tube 3a is induced by contacting it with the leaked solvent. AS shown in FIG. 4(B), the gap is sealed owing to the swelling of the heat-shrinkable fluororubber tube 3a. The heat-shrinkable fluororubber tube 3a owns the self-recovery function owing to the swelling as explained above.

In accordance with the above Embodiment 1, the heat-shrinkable fluororubber tubes 3a, 3b which have swelling property to solvent and solvent resistance are arranged between the heat-shrinkable Teflon® tube 4a, 4b and the zeolite membrane-covered ceramic tube 1. Therefore, an excellent sealing performance can be ensured by the self-sealing function of the heat-shrinkable fluororubber tubes at the respective connecting portions of the ceramic tube 1 with the metal tube 5 and the approximately circular cylindrical member 2, even when the zeolite membrane-covered ceramic tube 1, the metal tube 5 and the approximately circular cylindrical member 2 have respective surfaces in uneven condition at microscopic observations, or when the outer shape of the ceramic tube 1 shows out of round, and variations in the outer shapes of the ceramic tubes is observed, or when the outer diameters of the ceramic tube 1 and the metal tube 5 or the approximately circular cylindrical member 2 do not correspond to each other. Incidentally, with respect to the swelling, it is preferable that the volume increasing rate due to the swelling of the heat-shrinkable fluororubber tube is in the range of 2-15%. When the volume increasing rate is less than 2%, the self-sealing function and the self-recovery function cannot be obtained. When the volume increasing rate exceeds 15%, the durability (i.e., the estimated usable period) becomes shorter.

Even when the coefficient of linear expansion for the ceramic tube 1 is different from either of that for the metal tube 5 and that for the approximately circular cylindrical member 2, it is possible to ensure the excellent sealing properties at either of the connecting points of the ceramic tube 1 with the metal tube 5 and the approximately circular cylindrical member 2 because of the self-sealing function and the self-recovery function of the heat-shrinkable fluororubber tubes. Therefore, it is possible to ensure the sealing performance even under the environment of temperature fluctuations. Further, the tube end connector according to this Embodiment enjoys heat resisting cycle capability (e.g., heat resisting cycle capability of enduring against the temperature rise and down between the room temperature and 130° C.). Incidentally, such a heat resistance is good enough to be able to use in the temperature range for separating water and the solvent from each other. The preferable temperature range is of 50-200° C.

(Material Endurance Test)

Since material endurance test for the heat-shrinkable fluororubber tubes 3a, 3b according to this Embodiment was performed and the weight changing rate after the test was determined, the procedure of the test and the results from the test will be reported below.

A material endurance test was performed under a condition that the heat-shrinkable fluororubber tubes were exposed to a steam atmosphere formed by heating 90% IPA (isopropyl alcohol)-10% water solution. After the end of the test, the weight increasing rate of the heat-shrinkable fluororubber tube was determined, and the result was to be 7.5%. After the test, the tube was left to stand in air for one day, one week and two weeks, and the weight increasing rate after these standing was determined as 6.6%, 4.7%, and 3.8%, respectively.

According to the results of the test as mentioned above, it was confirmed that the heat-shrinkable fluororubber tubes absorbed IPA and thus swelled during the material endurance test, and as the result, the weights of the heat-shrinkable fluororubber tubes increased. Further, it was also confirmed that, when the swelled heat-shrinkable fluororubber tubes were left to stand in air, the weight increasing rate of the heat-shrinkable fluororubber tubes was decreased with the passage of time because the absorbed IPA was gradually released into the air.

(Control for Material Endurance Test)

For comparison, the material endurance test was also performed to a fluorine resin and silicone, and the weight changing rate after the test was determined. Since the procedure of the test is the same with the above mentioned one, the explanation about the test is omitted.

The weight increasing rates after the end of the test were 0.2% for the fluorine resin, and 11.6% for the silicone, individually. The weight increasing rate after left standing in air for one day after the test were 0.2% for the fluorine resin. The weight increasing rate after left standing in air for one week after the test were 0.2% for the fluorine resin, and −4.5% for the silicone, individually. Further, the weight increasing rate after left standing in air for two week after the test were 0.1% for the fluorine resin, and −4.5% for the silicone, individually.

According to the results of the control test as mentioned above, it was confirmed that the fluorine resin exhibited a solvent resistance against IPA, but it did not swell when coming into contact with IPA. Further, it was confirmed that silicone swelled with IPA, but silicone was dissolved by IPA since the weight thereof becomes lesser than that before the test, and thus the silicone did not possess a solvent resistance against IPA.

From the results of the above material endurance test and the control test, since the fluorine resin and silicone do not possess one of the solvent resistance or the swelling property, whereas the heat-shrinkable fluororubber tube possesses both of the solvent resistance and the swelling property, it can be said that the fluorine resin and silicone are not applied for the present invention.

(Confirmation Test for Sealing)

Next, since the examination to confirm the sealing performance of the tube end connector according to this Embodiment was performed, the procedure of the examination and the result of the examination will be illustrated.

Figure 5:
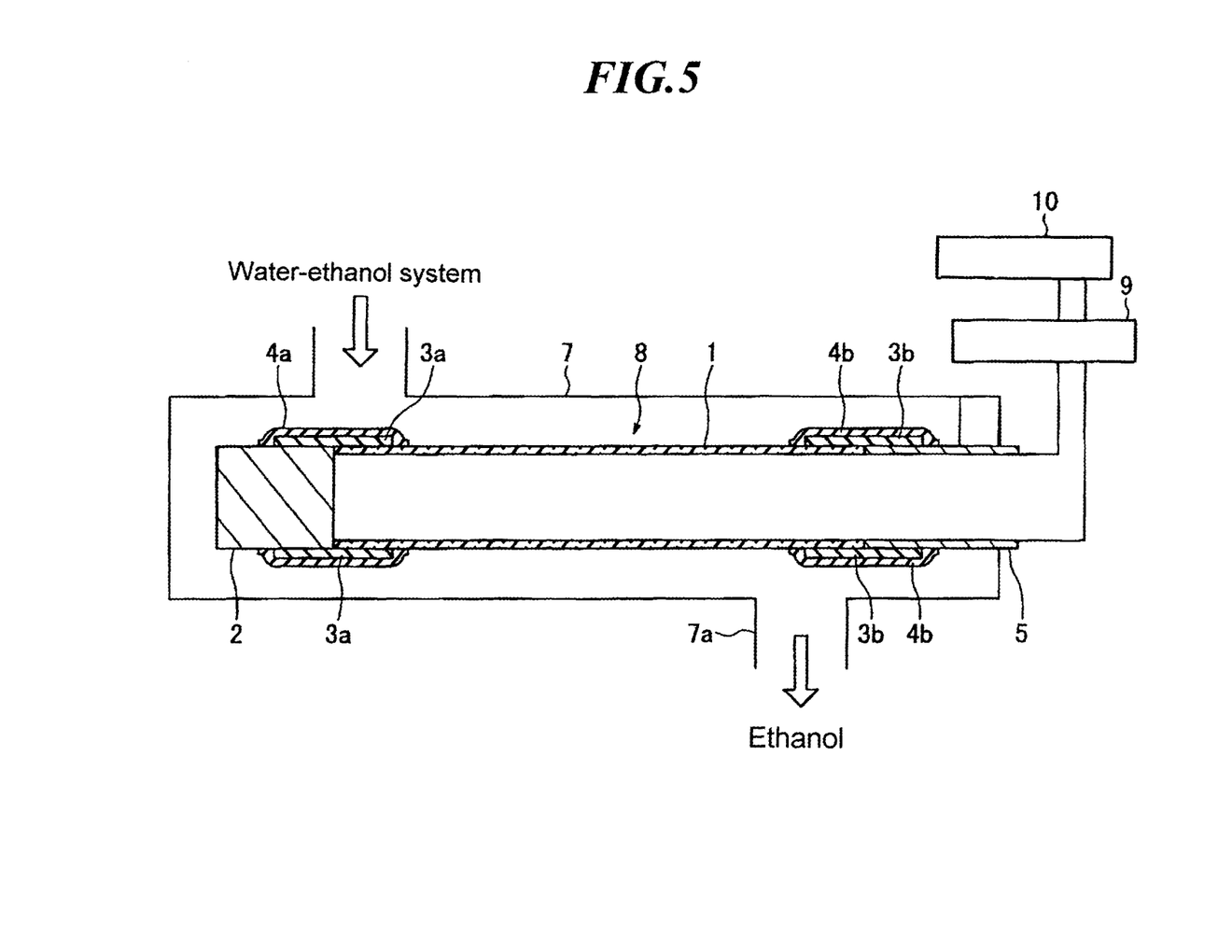
FIG. 5 is a sectional view showing the pervaporation (PV) testing apparatus.

FIG. 5 is a sectional view of the pervaporation (PV) testing apparatus. This testing apparatus is equipped with a vacuum line with a cold trap.

The testing apparatus includes a container 7 into which water-ethanol base feed liquid (the mass ratio of ethanol/ water=90/10) is fed. In the inside of the container 7, a separator 8 is installed. This separator 8 is prepared by sealing one end of a zeolite membrane covered ceramic tube 1 with an approximately circular cylindrical member 2 by means of a tube end connector 2 and jointing another end of the zeolite membrane covered ceramic tube 1 to the top end of a metal tube 5. Incidentally, the zeolite membrane covered ceramic tube 1 functions as a filter element.

The tail end of the metal tube 5 is connected to the vacuum line with a cold trap. Namely, the tail end of the metal tube is connected to a vacuum pump 10 via a liquid nitrogen trap (cold trap) 9. Further, an exhaust port 7a which discharges ethanol which is separated from the water-ethanol base feed liquid is provided for the above mentioned container 7.

A feed liquid (the mass ratio of ethanol/water=90/10) at 75° C. was fed to the container 7 of the testing apparatus, and suction was applied to the inside of the separator 8 with the vacuum pump 10. The vacuum degree on this occasion was 10 to 1000 Pa. The liquid which permeated the separator 8 was trapped with the liquid nitrogen trap 9. The composition of trapped material in the liquid nitrogen trap 9 was measured every 10 minutes by using a gas chromatograph (GC-14B manufactured by Shimadzu Corporation). According to the result of this measurement, the trapped material consisted of a mixture of water and ethanol. Although the ethanol concentration in the mixture at the initial stage was 1.5%, it became 0.05 after 10 hours, and thus it was confirmed that the separator possessed a high separation capability. Therefore, as for the part which connects one end of the zeolite membrane covered ceramic tube 1 with the approximately circular cylindrical member 2, and the part which connects another end of the zeolite membrane covered ceramic tube 1 with the metal tube, by means of the individual tube end connectors, it can be confirmed that the sealing performance was adequately ensured.

(Embodiment 2)

The tube end connector according to the Embodiment 2 of the present invention uses heat-shrinkable flexible fluorine resin tubes (not shown) (for instance, heat-shrinkable fluorine resin tube KH200, manufactured by SUMITOMO ELECTRIC INDUSTORIES, Ltd.), in place of the heat-shrinkable fluororubber tube 3a, 3b. Namely, excepting that the heat-shrinkable fluororubber tube 3a, 3b were replaced with the heat-shrinkable flexible fluorine resin tubes, the separator according to this Embodiment is the same with that shown in FIG. 1.

(Material Endurance Test)

A material endurance test for the heat-shrinkable flexible fluorine resin tubes according to this Embodiment was performed and the weight changing rate after the test was determined. Since the procedure of the test is the same with that of the material endurance test in the Embodiment 1, the explanation about this test is omitted.

The weight increasing rate of the heat-shrinkable flexible fluorine resin tubes which was determined after the end of the test was 5.4%. The weight increasing rates after left standing in air for one day, one week, and two weeks after the test were 4.7%, 4.2%, and 4.0%, respectively.

According to the results of the test as mentioned above, it was confirmed that the heat-shrinkable flexible fluorine resin absorbed IPA and thus swelled during the material endurance test, and as the result, the weights of the heat-shrinkable flexible fluorine resin tubes increased. Further, it was also confirmed that, when the swelled heat-shrinkable flexible fluorine resin tubes were left to stand in air, the weight increasing rate of the heat-shrinkable flexible fluorine resin tubes was decreased with the passage of time because the absorbed IPA was gradually released into the air. Thus, it was confirmed that the heat-shrinkable flexible fluorine resin tubes possessed both of the solvent resistance and the swelling property. Therefore, it can be said that the heat-shrinkable flexible fluorine resin tubes may demonstrate the self-sealing function as shown in FIG. 2 and the self-recovery function as shown in FIG. 4, as is the case with the heat-shrinkable fluororubber tubes in Embodiment 1.

In accordance with the above Embodiment 2, the heat-shrinkable flexible fluorine resin tubes which have swelling property to solvent and solvent resistance are arranged between the heat-shrinkable Teflon® tube 4a, 4b and the zeolite membrane-covered ceramic tube 1. Therefore, an excellent sealing performance can be ensured by the self-sealing function of the heat-shrinkable flexible fluorine resin tubes at the respective connecting portions of the ceramic tube 1 with the metal tube 5 and the approximately circular cylindrical member 2, even when the zeolite membrane-covered ceramic tube 1, the metal tube 5 and the approximately circular cylindrical member 2 have respective surfaces in uneven condition at microscopic observations, or when the outer shape of the ceramic tube 1 shows out of round, and variations in the outer shapes of the ceramic tubes is observed, or when the outer diameters of the ceramic tube 1 and the metal tube 5 or the approximately circular cylindrical member 2 do not correspond to each other.

Further, even when the coefficient of linear expansion for the ceramic tube 1 is different from either of that for the metal tube 5 and that for the approximately circular cylindrical member 2, it is possible to ensure the excellent sealing properties at either of the connecting points of the ceramic tube 1 with the metal tube 5 and the approximately circular cylindrical member 2 because of the self-sealing function and the self-recovery function of the heat-shrinkable flexible fluorine resin tubes. Therefore, it is possible to ensure the sealing performance even under the environment of temperature fluctuations. Further, the tube end connector according to this Embodiment enjoys heat resisting cycle capability (e.g., heat resisting cycle capability of enduring against the temperature rise and down between the room temperature and 130° C.).

(Confirmation Test for Sealing)

The examination to confirm the sealing performance of the tube end connector according to this Embodiment was performed by using the PV testing apparatus shown in FIG. 5. Since the procedure of this examination is same with that in Embodiment 1, the explanation thereof is omitted. According to the results of the examination, the trapped material consisted of a mixture of water and ethanol, and the ethanol concentration in the mixture after 10 hours was found to be 2.7%. Thus, it was confirmed that the separator can separate water and ethanol from each other with a good efficiency although it did not reach the efficiency obtained by the heat-shrinkable fluororubber tubes according to Embodiment 1. Further, the separation coefficient $\alpha$ was found to be not less than 2000, and thus, it was confirmed to have a high separation capability. Therefore, as for the part which connects one end of the zeolite membrane covered ceramic tube 1 with the approximately circular cylindrical member 2, and the part which connects another end of the zeolite membrane covered ceramic tube 1 with the metal tube, by means of the individual tube end connectors, it can be confirmed that the sealing performance was adequately ensured.

(Embodiment 3)

The tube end connector according to the Embodiment 3 (not shown) of the present invention has the same constitution with that used in Embodiment 2. However, the heat-shrinkable flexible fluorine resin tubes were dipped in ethanol at 30° C. for 10 minutes, in advance of setting the tube end connectors which used such heat-shrinkable flexible fluorine resin tubes into the separator shown in FIG. 1 in accordance with the procedure in Embodiment 1. As a result of performing the same confirmation test for sealing as being in Embodiment 2, it was confirmed that the ethanol concentration became 0.08% even at the initial stage, and thus the water and ethanol can be separated efficiently, ab initio.

The reason why the high separation performance can be obtained, ab initio, in Embodiment 3 is as follows. In Embodiment 2, it is considered that small gaps as shown in FIG. 2 (A) would be created between the heat-shrinkable flexible fluorine resin tubes and the zeolite-covered ceramic tube 1 at the initial stage of the test. On the contrary, in this Embodiment, it was possible that the heat-shrinkable flexible fluorine resin tubes swelled in advance of the test, because of taking the dipping treatment to the solvent in advance of the test. By using the swelled heat-shrinkable flexible fluorine resin tubes, it was possible to get the condition that the small gaps between the heat-shrinkable flexible fluorine resin tubes and the zeolite-covered ceramic tube 1 were disappeared even at the initial stage. As the result, it was possible to separate the solvent and water from each other, ab initio.

(Embodiment 4)

The tube end connector according to the Embodiment 4 (not shown) of the present invention has the same constitution with that used in Embodiment 1. However, the heat-shrinkable fluororubber tubes were dipped in ethanol at room temperature for 10 minutes, in advance of setting the tube end connectors which used such heat-shrinkable flexible fluorine resin tubes into the separator shown in FIG. 1 in accordance with the procedure in Embodiment 1. As a result of performing the same confirmation test for sealing as being in Embodiment 1, it was confirmed that the ethanol concentration became 0.1% even at the initial stage, and thus the water and ethanol can be separated efficiently, ab initio.

The reason why the high separation performance can be obtained, ab initio, in Embodiment 4 is similar with that of Embodiment 3. Namely, in Embodiment 1, it is considered that small gaps as shown in FIG. 2 (A) would be created between the heat-shrinkable fluororubber tubes and the zeolite-covered ceramic tube 1 at the initial stage of the test. On the contrary, in this Embodiment, it was possible that the heat-shrinkable fluororubber tubes swelled in advance of the test, because of taking the dipping treatment to the solvent in advance of the test. By using the swelled heat-shrinkable fluororubber tubes, it was possible to get the condition that the small gaps between the heat-shrinkable fluororubber tubes and the zeolite-covered ceramic tube 1 were disappeared even at the initial stage. As the result, it was possible to separate the solvent and water from each other, ab initio.

(Embodiment 5)

Figure 6:
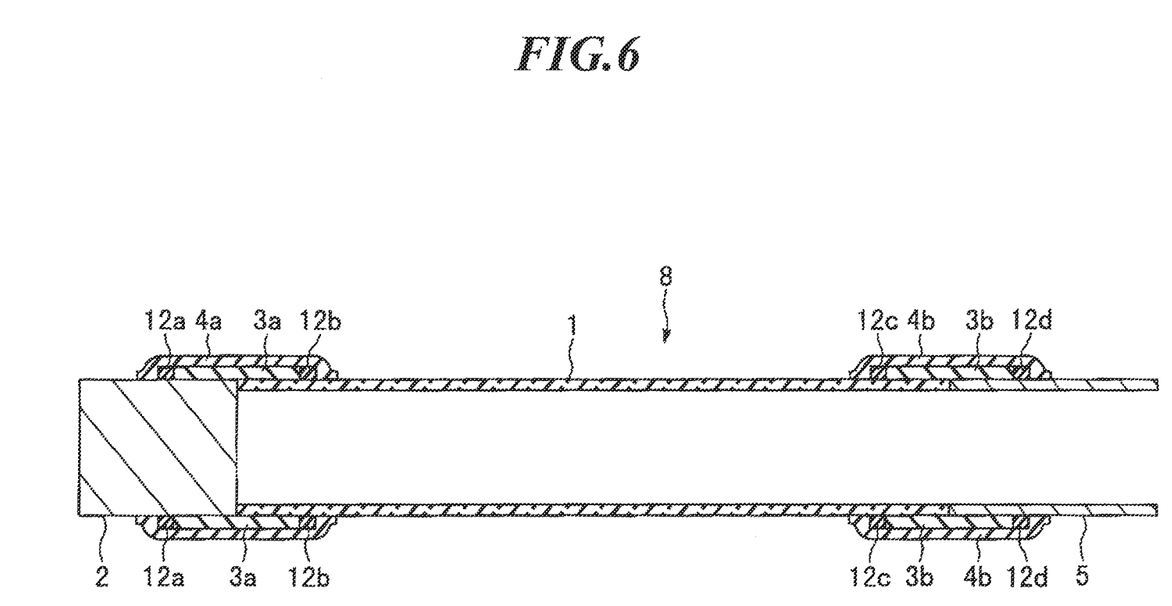
FIG. 6 is a sectional view showing a state that a zeolite membrane covered ceramic tube is connected with a metal tube and with an approximately circular cylindrical member by means of individual tube end connectors according to Embodiment 5 of the present invention.

FIG. 6 is a sectional view showing a state that a zeolite membrane covered ceramic tube is connected with a metal tube and with an approximately circular cylindrical member by means of individual tube end connectors according to Embodiment 5 of the present invention, wherein the same parts as shown in FIG. 6 are represented by the same numerals as shown in FIG. 1, and hereinafter, only the different points will be explained.

To one end of the heat-shrinkable fluororubber tube 3a, one end of the zeolite membrane-covered ceramic tube 1 is inserted, and to the another end of the heat-shrinkable fluororubber tube 3a, one end of the approximately circular cylindrical member 2 is inserted. Then, onto around the approximately circular cylindrical member 2, a heat-shrinkable flexible fluorine resin tube (for instance, heat-shrinkable fluorine resin tube KH200, manufactured by SUMITOMO ELECTRIC INDUSTORIES, Ltd.) 12a is placed so as to locate the heat-shrinkable flexible fluorine resin tube 12a at the other end of the heat-shrinkable fluororubber tube 3a, and onto around the zeolite membrane-covered ceramic tube 1, another heat-shrinkable flexible fluorine resin tube 12b is placed so as to locate the heat-shrinkable flexible fluorine resin tube 12b at the one end of the heat-shrinkable fluororubber tube 3a. Namely, one end of the zeolite membrane-covered ceramic tube 1 is connected to the approximately circular cylindrical member 2 forming a mutual agreement of their axes, and the both sides of this connecting part, each being at about 10 mm in width from the connected part are covered with the heat-shrinkable fluororubber tube 3a, and the heat-shrinkable flexible fluorine resin tubes 12a and 12b. Then, the heat-shrinkable fluororubber tube 3a and the heat-shrinkable flexible fluorine resin tubes 12a and 12b are allowed to shrink by heating them with a heat gun.

Next, to a heat-shrinkable tube 4a made of Teflon®, the zeolite membrane-covered ceramic tube 1 and the approximately circular cylindrical member 2 are inserted, thereby the heat-shrinkable tube 4a is positioned so that the heat-shrinkable fluororubber tube 3a and the heat-shrinkable flexible fluorine resin tubes 12a and 12b are covered with the heat-shrinkable tube 4a, and the both sides of the above mentioned connecting part, each being at about 13 mm in width from the connected part are covered with the heat-shrinkable tube 4a. Then, the heat-shrinkable tube 4a made of Teflon® is allowed to shrink by heating it with a heat gun. Thereby, a force which can tighten the heat-shrinkable fluororubber tube 3a, the heat-shrinkable flexible fluorine resin tubes 12a and 12b, the approximately circular cylindrical member 2 and the zeolite membrane-covered ceramic tube 1 inwardly is produced by the shrinkage of the heat-shrinkable tube 4a. Thus, the approximately circular cylindrical member 2 and the zeolite membrane-covered ceramic tube 1 can be fixed by the heat-shrinkable tube 4a via the heat-shrinkable fluororubber tube 3a and the heat-shrinkable flexible fluorine resin tubes 12a and 12b, and at the same time, the one end of the zeolite membrane-covered ceramic tube 1 can be sealed by the approximately circular cylindrical member 2.

Next, to another end of the zeolite membrane-covered ceramic tube 1, an end of a metal tube 5 is jointed in a similar fashion as above.

In detail, onto around another end of the zeolite-covered ceramic tube 1, a heat-shrinkable flexible fluorine resin tube 12c is placed, and then, to one end of the heat-shrinkable fluororubber tube 3b, another end of the zeolite membrane-covered ceramic tube 1 is inserted, and to the another end of the heat-shrinkable fluororubber tube 3b, one end of the metal tube 5 is inserted, and further, onto around another end of the metal tube 5, a heat-shrinkable flexible fluorine resin tube 12d is placed. Thereby, the heat-shrinkable flexible fluorine resin tube 12c is located at one end of the heat-shrinkable fluororubber tube 3b, and the heat-shrinkable flexible fluorine resin tube 12d is located at another end of the heat-shrinkable fluororubber tube 3b. Namely, another end of the zeolite membrane-covered ceramic tube 1 is jointed to the metal tube 5 forming a mutual agreement of their axes, and the both sides of this connecting part, each being at about 10 mm in width from the connected part are covered with the heat-shrinkable fluororubber tube 3b, and the heat-shrinkable flexible fluorine resin tubes 12c and 12d. Then, the heat-shrinkable fluororubber tube 3b and the heat-shrinkable flexible fluorine resin tubes 12c and 12d are allowed to shrink by heating them with a heat gun.

Next, to a heat-shrinkable tube 4b made of Teflon®, the metal tube 5 and the zeolite membrane-covered ceramic tube 1 are inserted, thereby the heat-shrinkable tube 4b is positioned so that the heat-shrinkable fluororubber tube 3b and the heat-shrinkable flexible fluorine resin tubes 12c and 12d are covered with the heat-shrinkable tube 4b, and the both sides of the above mentioned connecting part, each being at about 13 mm in width from the connected part are covered with the heat-shrinkable tube 4b. Then, the heat-shrinkable tube 4b made of Teflon® is allowed to shrink by heating it with a heat gun. Thereby, a force which can tighten the heat-shrinkable fluororubber tube 3b, the heat-shrinkable flexible fluorine resin tubes 12c and 12d, the metal tube 5 and the zeolite membrane-covered ceramic tube 1 inwardly is produced by the shrinkage of the heat-shrinkable tube 4b. Thus, the metal tube 5 and the zeolite membrane-covered ceramic tube 1 can be fixed by the heat-shrinkable tube 4b via the heat-shrinkable fluororubber tube 3b and the heat-shrinkable flexible fluorine resin tubes 12c and 12d, and at the same time, the jointing part mentioned above can be sealed.

The same effects as those of in Embodiment 1 can be also expected in Embodiment 5.

Incidentally, the present invention is not limited to the above mentioned embodiments, and, without deviating from the spirit of the present invention, various variations and modifications can be made on carrying out the present invention.

The invention claimed is:

1. A method to connect an end portion of a tubular zeolite separation membrane which comprises:

covering both an outer surface of an end portion of a first tubular member and an outer surface of an end portion of a second tubular member with a third member to connect the end portion of the first tubular member and the end portion of the second tubular member, and covering the third member with a covering member, wherein the first tubular member is a zeolite separation membrane in which zeolite crystals are formed on a tubular porous ceramic support, wherein the third member has solvent resistance and swelling property to solvent, and wherein the covering member compromises a thermally shrinkable tube.

2. The method to connect an end portion of a tubular zeolite separation membrane according to claim 1, which comprises shrinking the third member by heat after covering both the outer surface of the end portion of the first tubular member and the outer surface of the end portion of the second tubular member with the third member.

3. The method to connect an end portion of a tubular zeolite separation membrane according to claim 1, which comprises shrinking the covering member by heat after covering the third member with the covering member.

4. The method to connect an end portion of a tubular zeolite separation membrane according to claim 1, wherein the second tubular member is a metallic tube.

5. The method to connect an end portion of a tubular zeolite separation membrane according to claim 1, wherein a volume increment ratio due to swelling of the third member is not less than 2% and not more than 15%.

6. The method to connect an end portion of a tubular zeolite separation membrane according to claim 1, wherein the third member shows thermal resistivity in a temperature range of 50-200° C.

7. The method to connect an end portion of a tubular zeolite separation membrane according to claim 1, wherein the third member comprises a heat-shrinkable fluororubber tube or a heat-shrinkable flexible fluorine resin tube.

8. The method to connect an end portion of a tubular zeolite separation membrane according to claim 1, wherein the covering member is capable of contracting toward the center of the covering member.

9. The method to connect an end portion of a tubular zeolite separation membrane according to claim 1, wherein the thermally shrinkable tube is made of fluorine resin.

* * * * *